Dec. 7, 1954  E. C. PETRY  2,696,118
TEMPERATURE INDICATING DEVICE
Filed Nov. 30, 1950
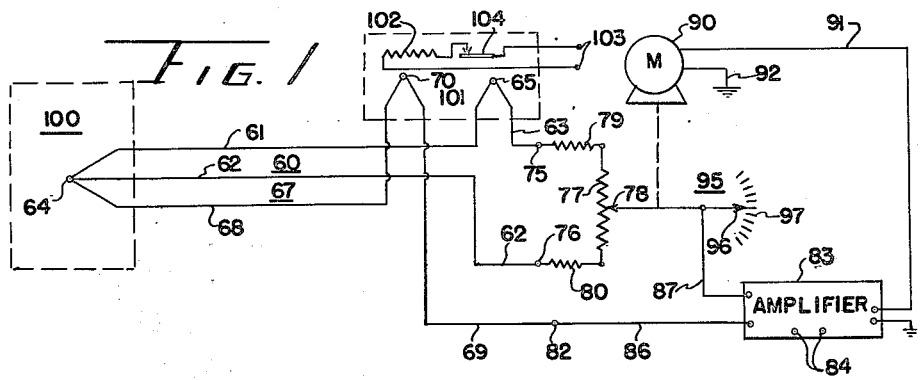
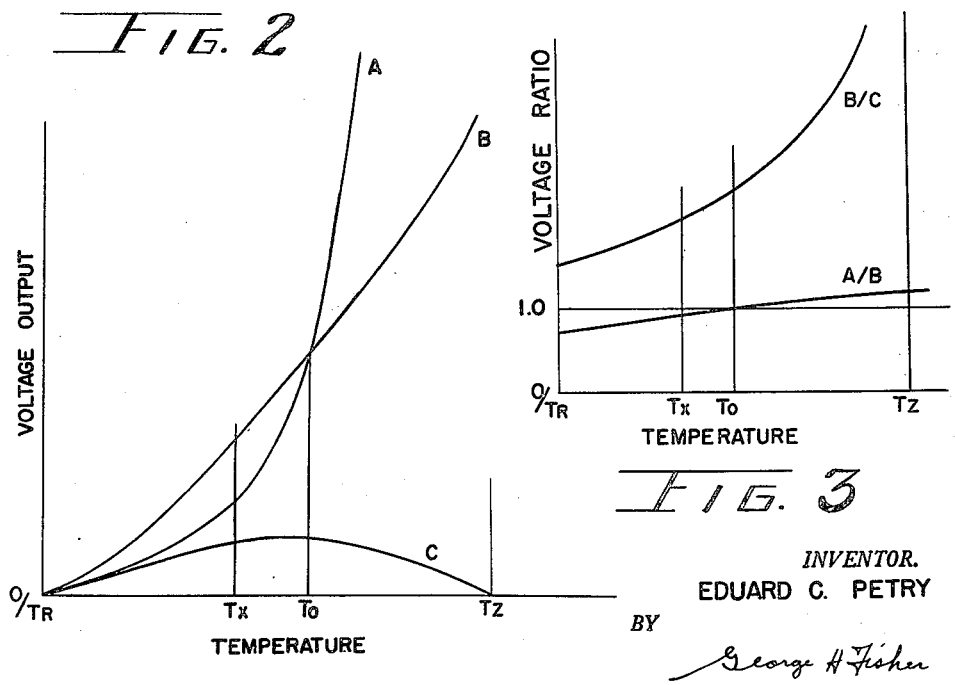
INVENTOR.
EDUARD C. PETRY
BY
George H Fisher
ATTORNEY.

United States Patent Office 2,696,118
Patented Dec. 7, 1954

2,696,118

TEMPERATURE INDICATING DEVICE

Eduard C. Petry, Minneapolis, Minn., assignor to Minneapolis-Honeywell Regulator Company, Minneapolis, Minn., a corporation of Delaware Application November 30, 1950, Serial No. 198,263

1 Claim. (Cl. 73—359)

The present invention is concerned with a new and an improved thermo-electric temperature indicating or measuring circuit which is particularly adapted for use without a separate standardization voltage source.

In the thermo-electric thermometry field considerable progress has been accomplished since the discovery of Seebeck that an electric current would be generated in a closed circuit comprising two dissimilar metals when the junctions of the metals are maintained at different temperatures.

Today the name thermocouple, that has been given to the junction of two dissimilar metals for the purpose of obtaining a voltage output is quite common in nearly every field of industry. The conventional thermocouple temperature-measuring potentiometer circuit usually comprises a slide-wire rheostat, a galvanometer, a service cell which furnishes the potential that is necessary to operate the potentiometer circuit, a thermocouple, and a standard cell. In a portable potentiometer circuit the service cell, being a battery of the common dry cell type, often ages with use, therefore, it is necessary that a standard voltage cell be available to calibrate the potentiometer circuit. Since the accuracy of the thermocouple temperature-measuring potentiometer circuit depends primarily on the constancy of the output voltage of the service cell or any standardization voltage supply that might be used in the particular case, the output of the voltage sources that are made available such as by the use of rectifiers connected to an alternating current generating supply are not stable or consistent enough for use in such a circuit. The standard cell which is available on the commercial market can be used when the service voltage is not constant.

These standard voltage cells must be constructed to withstand various conditions that such a thermocouple temperature-measuring potentiometer circuit might have to withstand. However, the environmental conditions associated with airborn equipment have presented problems which made the construction of such a standard cell almost impractical and very expensive.

In the conventional thermocouple temperature-measuring potentiometer circuit, it has been desirable to have a thermocouple with a linear voltage output which varies with the thermocouple "hot junction" temperature. In the present invention it is required that the voltage output of at least one of the thermocouples be of a non-linear characteristic as a function of the temperature difference of its junctions.

It is therefore an object of the present invention to provide a new and improved temperature indicating apparatus that does not require a standard voltage cell for the calibration of the potentiometer circuit.

Another object of the present invention is to provide a temperature-indicating apparatus in which the output voltage of one thermocouple is connected to a potentiometer and the output voltage of a second thermocouple is connected for comparison with a portion of the voltage across the potentiometer so that the ratio of the two output voltages provides an indication of the temperature of the hot junctions of the two thermocouples, the temperature of the cold junctions remaining constant.

Still another object of the present invention is to provide a temperature-indicating apparatus in which the output voltage of a thermocouple is applied to a potentiometer and the output voltage of a second thermocouple that has one metal or alloy wire that is common to the first thermocouple is connected for comparison with a portion of the voltage across the potentiometer so that the ratio of the two voltages obtained from the two thermocouples provides an indication of the temperature of the hot junctions of the thermocouples, again, the temperatures of the cold junctions remaining constant.

And still another object of the present invention is to provide a temperature-indicating apparatus in which the output voltage of a thermocouple, having a non-linear characteristic of output voltage as a function of the temperature of the hot junction of the thermocouple, the cold junction temperatures remaining constant, is applied to a potentiometer and the output voltage of a second thermocouple is connected for comparison with a portion of the voltage across the potentiometer so that the ratio of the two output voltages provides an indication of the temperature of the hot junctions of the two thermocouples.

These and other objects of the invention will become apparent after reading the attached specification in connection with the associated drawings wherein:

Figure 1 is a circuit diagram of the invention;

Figure 2 is a graphical representation of the output voltages as a function of the temperature of the hot junction of three theoretical thermocouples A, B, and C, and Figure 3 is a graphical representation of the ratios of the output voltages, as a function of the hot junction temperature, of the theoretical thermocouples shown in Figure 2.

Referring to Figure 1, a first thermocouple 60 comprising two dissimilar metallic elements 61 and 62, and an element 63 which is identical to the element 62 to form the junctions 64 and 65, which are commonly known as the hot and cold junctions. A second thermocouple 67 comprising two dissimilar metallic elements 62 and 68, and an element 69 which is identical to the element 62 to form a junction 64 and a junction 70 which is commonly known as the cold junction. The hot junction 64 consists of the junction of the three elements 61, 62, and 68 of which element 62 is common to both of the thermocouple circuits 60 and 67.

The elements 62 and 63 of the two thermocouples are connected to the two terminals 75 and 76 of a potentiometer circuit comprising a potentiometer 77 having a tap 78 and two ballast resistors 79 and 80 that are connected in series with the potentiometer 77 between the two terminals 75 and 76. The element 69 is connected to a terminal 82. The terminals 75, 76 and 82 can obviously be positioned in the circuit in other locations. However, it is intended that these terminals provide the connections between the metallic elements that compose the thermocouples and the conductors which are commonly copper, that are used in the associated potentiometer circuit of such a temperature-measuring apparatus.

An amplifier 83, of the conventional electronic voltage amplifier type, is supplied power from an external source through the power terminal connections 84. The input terminals to the amplifier are connected to the terminal 82 by a conductor 86 and the variable tap 78 by a conductor 87. The output terminal of the amplifier is connected to a motor 90 by a conductor 91. A second conductor 92, that is connected to the motor 90, is connected to ground. An indicating device 95 comprises a variable position pointer 96 and a scale 97. The pointer 96 is mechanically connected to the variable position tap 78 so that the position of the tap 78 on the potentiometer 77 will be indicated by the pointer 96 on the scale 97. The motor 90 is mechanically coupled to the variable position tap 78 in such a manner that the amplifier 83 upon receiving an input signal will energize the motor and cause movement of the tap 78 to a predetermined position depending upon the temperature of the hot junction 64 of the thermocouple. The scale 97 can be calibrated so that the position of the tap 78 will indicate on the scale 97 the temperature of the hot junction 64 of the thermocouple.

The hot junction 64 is contained in a chamber 100 which might be an oven, engine, or any other type of chamber in which the temperature is to be measured. The cold junctions 65 and 70 of the thermocouples are also contained in a chamber 101 whose temperature is thermostatically controlled by a heater 102 that is connected to an external power supply by the conductors 103. The power input to the heater 102 is controlled by a bimetal switching device 104.

Referring to Figure 2, graphical representations of the voltage output as a function of the hot junction temperature of several theoretical thermocouples A, B, and C, are shown. The origin of the voltage and temperature axis of Figure 2 is zero voltage and a reference temperature which is the temperature of the cold junctions, for example, the temperature of junctions 65 and 70 of Figure 1. The invention depends on the non-linear characteristics of the voltage output as a function of temperature of the hot junctions of the thermocouples.

Such output characteristics as shown in Figure 2 can be obtained from thermocouples that have elements that are made of different alloys or metal. It is well known that the E. M. F. equation for a thermocouple is of the general form:

$$V = at + bt^2 + ct^3 + \ldots \quad (1)$$

where $t$ is the temperature differential between the hot and cold junctions of the thermocouple and $a$, $b$, and $c$ are constants of the particular thermocouple being considered.

For the great majority of thermocouples the constant $c$ is so very small that the cubic term and likewise all higher power terms of the above equation can be disregarded for all practical purposes. The equation can now be put in the form of:

$$V = b\left[\left(t + \frac{a}{2b}\right)^2 - \frac{a^2}{4b^2}\right] \quad (2)$$

it can be seen that this is in the form $X^2 = 2pY + k$, which is the equation of a parabola. Therefore the curves A, B, and C of Figure 2 are parabolic curves. Figure 2 is a plot of the parabolic curves in only the first quadrant of the voltage and temperature coordinate system. The explanation of the operation of the apparatus will be with respect to only this first quadrant, however, the operation of the apparatus is not to be considered as restricted to the case where these curves lie in the first quadrant. Examples of these output voltage characteristics can be obtained from the International Critical Tables of Numerical Data, Physics, Chemistry and Technology that have been published for the National Research Council of the United States of America in which output curves showing thermal E. M. F. in microvolts as a function of the temperature in degrees centigrade for combinations of elements made of various alloys and metals are available.

Referring to Figure 3, a graphical representation is shown of the ratios of the output voltages as a function of the hot junction temperature for combination of the theoretical thermocouples shown in Figure 2. By way of explanation, consider the above Equation 1, neglecting the cubic term. The ratio of the output voltages V of two thermocouples such as A and B of Figure 2 can be expressed as:

$$\frac{V_A}{V_B} = \frac{a_A + b_A t}{a_B + b_B t} = R \quad (3)$$

where R is the ratio $Va/Vb$. The form of this equation can be changed to:

$$Ra_B + Rtb_B - b_A t = a_A$$

or, $$\left(R - \frac{b_A}{b_B}\right)\left(t + \frac{a_B}{b_B}\right) = a_A - \frac{a_B b_A}{b_B^2} \quad (4)$$

This equation is recognizable as the equation of a hyperbola of the form $$(X - a)(Y - b) = c$$

In this equation $a$ and $b$ are the asymptotic intercepts of the hyperbola. Therefore, the curves of Figure 3 are hyperbolic curves having asymptotic intercepts $$\frac{b_A}{b_B} \text{ and } \frac{a_B}{b_B}$$

which intercepts can be seen to be a function of the particular thermocouple being considered.

In a basic arrangement of a thermo-electric circuit which is composed of a closed loop of two elements E and F, and the current flows from the E element to the F element at the cold junction of the thermocouple, the element E is generally referred to as thermoelectrically positive to F element.

In such a closed thermocouple loop of the two elements E and F having a hot junction and a cold junction, it is possible to separate the elements at the cold junction and connect each of the elements to one of two conductors, preferably copper, of a potentiometer circuit. In such a circuit the junctions between the copper conductors and the two elements E and F would be the cold junctions or reference junctions. It would not only be necessary to maintain the two junctions at the same temperature but at a constant temperature, unless a compensative means was employed, if the hot junction is to be capable of measuring temperature. Such a circuit connection is used in the conventional thermocouple temperature measuring instruments. Once the bridge circuit of the instrument is calibrated it is assumed that the bridge temperature as well as the temperature of the cold junctions will remain relatively constant. Should the ambient temperature around the cold junctions change, assuming there is no compensative means, the temperature measurement would also change provided the hot junction temperature remains constant.

In such a closed thermocouple loop of two elements E and F having a hot and a cold junction, it is possible to break either of the elements E or F, at any desired point between the hot and cold junctions, and connect the broken end of each of the two portions of the broken element to one of two conductors of a potentiometer circuit. Assume that the F element of a closed thermocouple loop of the elements E and F is broken between the two junctions and connected to two copper conductors. The thermocouple circuit would have a hot junction of the E and F elements, a cold junction of the E and F elements, and a pair of junctions of the F element and the copper conductors. In this circuit the cold junction temperature must be maintained at a constant temperature, assuming that there is no compensative means employed, and the temperatures of the junctions between the F element and the copper conductors must remain the same, if a potentiometer connected to the conductors is to accurately indicate the hot junction temperature. However, it is not necessary that the common temperature of the junctions between the F element and the copper conductor remain constant. If the two junctions between the F element and the copper conductors are not maintained at the same temperature, the resultant thermal electromotive force in the circuit will depend not only upon thermocouple element materials and the temperature of the measuring junction, either the hot or the cold, as the case may be, but also upon the temperatures of these added junctions and the thermoelectric characteristics of copper, with respect to the element F.

In referring to Figure 2, let us assume that the material of the element 62 of the thermocouple circuit 60 is thermoelectrically positive with respect to the other element 61 so that the current flows from the element 63, which, in effect, is a continuation of element 62, to the element 61 through the cold junction 65. If the positive terminal of the apparatus, that terminal from which the current flows from the thermocouple 60, is connected to the terminal 76 and the negative terminal of the apparatus is connected to the terminal 75, the output voltage of the thermocouple 60 will be applied to the potentiometer circuit. Let us assume that the output voltage of the thermocouple 60 has a characteristic that is similar to the characteristic of the theoretical thermocouple B, as shown in Figure 2. The second thermocouple 67 is composed of such materials that the element 68 is positive with respect to the element 62. Therefore, the positive terminal of the thermocouple 67 is connected to the terminal 76. Let us assume that the voltage output characteristic of the thermocouple 67 is similar to the theoretical output curve C that is shown in Figure 2. The output voltage of the thermocouple 67 is applied between the terminal 76 and the potentiometer tap 78 by means of the circuit from the terminal 82, through the conductor 86, the amplifier 83, the conductor 87, and to the tap 78 of the potentiometer 77. The voltage output of the thermocouple 67 is connected for comparison with the voltage that is applied across the potentiometer between the terminals 75 and 76 by the thermocouple 60.

The amplifier 83 is designed so that the output of the amplifier will position the motor 90 so that the tap 78 of the potentiometer 77 will be in such a position that the drop across the potentiometer between the terminal 76 and the tap 78 will be equal to the voltage produced by the thermocouple 60. Since the output voltages of the two thermocouple circuits are non-linear it is apparent that the position of the tap of the potentiometer 77 will be different for every value of temperature. It is possible that only one of the output curves be non-linear and still have proper operation of the invention. In other words, the position of the tap 78 will depend upon the ratio of the output voltages of the two thermocouples 60 and 67 as shown in Figure 3.

The temperature range of the thermocouple temperature measuring circuit as shown in Figure 1 has definite temperature limits that depend on the characteristics of the thermocouples 60 and 67. It can readily be seen by considering the apparatus of Figure 1, that the usable range of the apparatus is the range over which the output voltage of thermocouple 60 is greater than the output voltage of thermocouple 67, or in other words the output voltage ratio of thermocouple 67 to thermocouple 60 must be less than 1. If this condition should reverse, the tap 78 would tend to run off one end of the potentiometer 77 in an attempt to rebalance the system and a limit of a working range of the apparatus would have been reached.

With thermocouples 60 and 67 assumed to be similar to thermocouples B and C of Figures 2 and 3 it can be seen that at no temperature within the range plotted will the output voltage of thermocouple C be greater than the output voltage of thermocouple A. However, it will be observed from Figure 2 that the output voltage parabolic curve of thermocouple C intersects the temperature axis at a temperature $T_z$. The resultant effect is that the ratio of B/C as shown in Figure 3 goes to infinity at this temperature. In other words, this temperature $T_z$ is the asymptotic intercept of the hyperbolic curve B/C. Therefore, the apparatus of Figure 1 using the thermocouples B and C has an upper temperature limit at $T_z$. It will be remembered that the asymptotic intercepts of the hyperbolic curves of Figure 3 are governed only by the particular thermocouple selected and that the above explanation and limitation in temperature range is changed as different thermocouples are used.

Assume that the thermocouples 60 and 67 in the circuit of Figure 1 had output characteristics similar to the theoretical thermocouples whose output characteristics are shown in Figure 2 as the curves A and B respectively. Using the thermocouples A and B, two distinct ranges exist. As stated above, the output voltage ratio of thermocouple 67 to thermocouple 60 can never be greater than 1 within a given range. By referring to Figure 3 it can be seen that at the temperature $T_0$ the ratio is equal to 1. Therefore with the assumption that thermocouples 67 and 60 of Figure 1 are similar to thermocouples A and B respectively, a first range exists for temperature values less than $T_0$. A second range can be obtained by interchanging the thermocouples so that now thermocouples 60 and 67 are similar to thermocouples A and B respectively. This second range extends to the right for temperature values greater than $T_0$. It must again be noted that the above limitation in range for the apparatus of Figure 1 is a function of the particular thermocouples selected and that the ranges are changed as different thermocouples are used. The above explanation, while limited to specific thermocouples selected from Figure 2, has considered only the case where the temperature differential between the so-called hot and cold junctions of thermocouples 60 and 67 have been a positive differential, that is, the temperature of the hot junction has been considered always higher than the temperature of the cold junctions. It will be immediately recognized that the same general analysis carried forth above can be used to determine the operation of the apparatus when a negative differential exists. For example, the operation of the apparatus could be analyzed considering the curves of Figure 2 as the third quadrant of the voltage and temperature coordinate system where the temperature differential is negative.

The cold junctions of the thermocouples are shown to be maintained at a constant temperature by a thermostatically-controlled chamber. It is possible that the cold junctions of the two elements that compose the thermocouples be connected directly to the potentiometer circuit so that the cold junction actually exists at the terminals of the potentiometer network. With this type of connection it would be necessary that the connections of the cold junction to the potentiometer circuit be maintained at a constant temperature since the accuracy of the thermocouple circuit depends on the constancy of the temperature of the cold junction. If we assume that the temperature of the potentiometer and associated circuit would be maintained at a constant ambient temperature it would be possible in Figure 1 to connect the thermocouple circuit so that element 61 is connected directly to terminal 75 and element 68 is connected directly to terminal 82. In such a circuit connection the temperature of the terminals 75, 76, and 82 would not only have to be maintained at the same temperature but at a constant temperature. In the circuit as shown in Figure 1, it is assumed that the temperature of the terminals 75, 76, and 82 are maintained at the same temperature so that the thermoelectric voltages generated by the junctions equally balance one another.

Assuming that the temperatures of the terminals 75, 76, and 82 of the circuit shown in Figure 1 are at the same temperature and that the cold junction temperature is constant, the resistance of the ballast resistors 79 and 80 could be selected so that the potentiometer tap 78 would move from the lower end to the upper end of the potentiometer winding 77 for a temperature range $T_x$ to $T_0$ to be measured, as shown on the output voltage versus temperature characteristic curve, with a selection of elements that will produce the theoretical curves A and B for thermocouples 67 and 60 respectively.

The selection of materials that are to be used in the elements of the thermocouples must be considered for the temperature range to be used in each particular case.

*Operation*

The operation of the circuit shown in Figure 1 will be explained with the assumption that the voltage output characteristics of the thermocouples 60 and 67 are similar to the characteristics represented by the lines B and C, respectively, of Figure 2. Assume that the temperature range of the oven 100 is between the temperature limits $T_x$ and $T_0$ as shown on the voltage temperature scale in Figure 2. With the temperature of the cold junctions being maintained at a constant value, the voltage output characteristics of the thermocouples 60 and 67 will depend on the temperature of the hot junction 64 contained in the oven 100.

At a temperature $T_x$ the voltage output of the thermocouple 60 will be applied between the terminals 75 and 76. The output voltage of the thermocouple 67 is connected to the terminals 76 and 82, so that the voltage that is applied to the amplifier 83 is the algebraic sum of the voltage of the thermocouple 67 and the voltage drop across the portion of the circuit between the terminal 76 and the variable tap 78. Assume that the ballast resistors 79 and 80 are adjusted so that at a temperature $T_x$ the algebraic sum of the voltages of the thermocouple 67 and the voltage drop between the terminal 76 and the variable tap 78 is zero when the tap 78 is positioned at the extreme upper position of the potentiometer winding 77. When the algebraic sum of the two voltages that were previously mentioned is zero, it is said that the variable tap 78 is at a "null" position on the potentiometer winding 77. For this particular "null" position the scale pointer 96 of the indicator device 95 would be at a position to indicate the temperature $T_x$ on the scale 97.

Let us assume that the temperature of the oven 100 increases. The output voltage of the thermocouple 60 would increase. Since the voltage that is applied to the terminals 75 and 76 has increased the voltage across the portion of the circuit between the terminal 76 and the variable tap 78 would also increase. The output of the thermocouple 67 as shown by the voltage characteristic curve C in Figure 2 has increased but not as much as the voltage output of the thermocouple 60. Therefore, the algebraic sum of the voltage of the thermocouple 67 and the voltage across the portion of the circuit between the terminal 76 and the tap 78 would result in a signal being applied to the amplifier 83 through the conductors 86 and 87. This signal can be expressed in equation form as $$\text{Amplifier voltage} = V_{20} - kV_{10} \quad (5)$$

where $k$ is a term indicative of the position of tap 78 and can be expressed as $$k = R_1/R_2 \quad (6)$$

where $R_1$ is the potentiometer resistance from tap 78 to terminal 76, and $R_2$ is the total potentiometer resistance from terminal 75 to terminal 76. This signal on being applied to the amplifier 83 would render the motor 90 operative and thereby move the variable tap 78 downward on the potentiometer winding to a new "null" position. This new "null" position would be at a temperature above $T_x$ and that temperature would be indicated by the pointer 96 on the scale 97. This new "null" selected by operation of motor 90 as above described results in the amplifier voltage, set forth in Equation 5 above, being reduced substantially to zero. Equation 5 can now be expressed as $$k = V_{20}/V_{10}$$

therefore the position of the tap 78, which is indicative of the temperature of oven 100, is in fact a measure of a ratio which is a function of the output voltages of the thermocouples 60 and 67.

Let us further assume that the temperature of the oven 100 rises to a value of $T_0$. The output voltage of the thermocouple 60 would increase and the portion of the voltage between the terminal 76 and the tap 78 would be greater than the voltage output of the thermocouple 67. Therefore, the difference between these two voltages would produce a signal to the amplifier to be effective to cause the motor to move the variable tap 78 downward on the potentiometer winding 77 until the null position of the variable tap was reached for the temperature $T_0$. At this null position, the temperature $T_0$ would be indicated on the scale 97 by the pointer 96.

As the temperature of the oven 100 dropped from the temperature $T_0$ to the temperature $T_x$ the algebraic sum of the voltage between the terminal 76 and the variable tap 78 and the voltage of the thermocouple 67 would produce a signal to the input circuit of the amplifier 83. This signal would be relatively similar to the signal produced when the temperature increased, except the polarity of this signal would be opposite. The change in polarity of the signal to the amplifier 83 would produce a rotation of the output shaft of the motor 90 in the opposite direction and therefore cause the variable tap 78 to move upward on the potentiometer winding 77 to a "null" position.

The movement of the pointer 96 along the scale 97 of the indicator device 95 would depend directly on the movement of the tap 78 to produce a "null" condition at any particular temperature. The relation of the movement of the pointer to the temperature of the hot junction 64 of the thermocouples 60 and 67 would change whenever the selected elements of the thermocouples 60 and 67 produce different voltage output characteristics.

Having thus described my invention, I claim:

A temperature indicating system comprising, three dissimilar metallic elements connected together at a common point and positioned in an atmosphere so as to be subjected to temperature of the atmosphere to be indicated, a first and second element of said three elements combining to form a hot junction of one thermocouple and the third and second of said elements forming a hot junction of a second thermocouple, said first and second thermocouples having similar speeds of response but having differing and nonlinear voltage responses, cold junctions for said first and second thermocouples being formed by the extremities of the first and third metallic elements remote from said common point and including connections formed of a material the same as said second metallic element, said cold junctions being held at a substantial constant temperature, a potentiometer including a winding connected at one of its extremities to the connection of said cold junction of said first thermocouple and connected at its other extremity to the extremity of said second metallic element remote from said common point, an amplifier, wiper means for said potentiometer winding connected to an input terminal of said amplifier, a second input terminal of said amplifier connected to the connection of said cold junction of said second thermocouple, control motor means operatively connected to said wiper means, output terminals for said amplifier, means connecting said output terminals of said amplifier to said control motor to control operation of said control motor, the amplifier responding to the differential of the outputs of said first and second thermocouples and controlling the operation of said control motor means to operate said wiper means of said potentiometer until the input to said amplifier is nulled, and indicator means connected to and operated by said motor means to provide an indication of the temperature of said atmosphere.

References Cited in the file of this patent

UNITED STATES PATENTS

| Number | Name | Date |
|---|---|---|
| 1,206,304 | Chubb | Nov. 28, 1916 |
| 1,753,486 | Travis | Apr. 8, 1930 |
| 2,054,120 | De Florez | Sept. 15, 1936 |
| 2,300,742 | Harrison et al. | Nov. 3, 1942 |

FOREIGN PATENTS

| Number | Country | Date |
|---|---|---|
| 184,455 | Germany | May 11, 1907 |
| 388,739 | Germany | Jan. 24, 1924 |